(12) United States Patent
Lee

(10) Patent No.: US 8,012,293 B2
(45) Date of Patent: Sep. 6, 2011

(54) TPU LAMINATED FABRIC PRODUCT AND METHOD FOR FORMING THE PRODUCT

(75) Inventor: Chi-Shih Lee, Taichung Hsien (TW)

(73) Assignee: Jah Yih Enterprise Co., Ltd., Taichung Hsien (TW)

( * ) Notice: Subject to any disclaimer, the term of this patent is extended or adjusted under 35 U.S.C. 154(b) by 484 days.

(21) Appl. No.: 12/238,498

(22) Filed: Sep. 26, 2008

(65) Prior Publication Data

US 2010/0080966 A1  Apr. 1, 2010

(51) Int. Cl.
*B32B 3/10* (2006.01)
*B32B 38/10* (2006.01)

(52) U.S. Cl. ........................ 156/249; 428/203

(58) Field of Classification Search .................. 156/249; 428/203
See application file for complete search history.

*Primary Examiner* — Kat Wyrozebski
*Assistant Examiner* — Daniel Lee
(74) *Attorney, Agent, or Firm* — Alan Kamrath; Kamrath & Associates PA

(57) ABSTRACT

A method for manufacturing a TPU laminated fabric product comprises the following steps. First step: preparing a roll of TPU film and a roll of releasing film. Second step: attaching the TPU film to the releasing film. Third step: printing a desirable pattern or image on a first surface of the TPU film opposite to the releasing film. Fourth step: parting the TPU film from the releasing film. Fifth step: preparing a roll of base fabric. Sixth step: applying glue to a second surface of the TPU film opposite to the first surface of the TPU film. Seventh step: attaching the second surface of the TPU film with the base fabric and getting a finished TPU laminated fabric product.

10 Claims, 5 Drawing Sheets

TPU LAMINATED FABRIC PRODUCT AND METHOD FOR FORMING THE PRODUCT

BACKGROUND OF THE INVENTION

1. Field of the Invention

The present invention relates to a TPU laminated fabric product and method for forming the product.

2. Description of the Related Art

Current coated and laminated fabrics are usually produced via coating or adhering PVC (polyvinyl chloride) film on fabric. However, PVC is not degradable and is not an environment-friendly material. Further, if the PVC coated fabric has a pattern on the surface thereof, the coating PVC will hide the pattern lines. It results in lack of aesthetics of the current, coated, laminated fabric products.

TPU (thermoplastic polyurethane) is a new raw material for manufacturing of laminated fabric and has a degradation capability at the normal atmospheric temperature, so that TPU is a kind of environment-friendly material. TPU and PVC are both water-repellent, but the air permeability of TPU is greater that the air permeability of PVC. A film made of TPU has nice resilience so as to be deformed easily by any external force. The transparency of the TPU film is great, too. Currently, there are two processes for printing patterns or images on a TPU laminated fabric. The first process is printing the desired pattern or images onto a base fabric first, and then, attaching a TPU film with the printed base fabric. The second process is attaching the TPU film with the base fabric first, and then printing the desired pattern or images onto the TPU film. However, the shortcoming of the first process is that the surface of the base fabric is rough, so that the printed pattern of images would lack an aesthetic presentation. The shortcoming of the second process is that the pattern or images are printed on the outside of the TPU laminated fabric so that the pattern or images are easy to be worn-off.

The present invention is therefore intended to obviate or at least alleviate the problems encountered in the prior art.

The present invention is therefore intended to obviate or at least alleviate the problems encountered in prior art.

SUMMARY OF THE INVENTION

The present invention solves this need and other problems in the field of methods for manufacturing laminated fabric products by providing, a method for manufacturing a TPU laminated fabric product including the following steps. First step: preparing a roll of TPU film and a roll of releasing film. Second step: attaching the TPU film to the releasing film via a first lamination press roll mechanism. Third step: printing any desirable pattern or images on the TPU film opposite to the releasing film via a printing mechanism. Fourth step: parting the printed TPU film from the releasing film via a release mechanism. Fifth step: preparing a roll of base fabric. Sixth step: applying glue to the printed TPU film. Seventh step: attaching the printed TPU film with the base fabric via a second lamination press roll mechanism and getting a finished TPU laminated fabric product.

The present invention will become clearer in light of the following detailed description of illustrative embodiments of this invention described in connection with the drawings.

BRIEF DESCRIPTION OF THE DRAWINGS

The present invention will be described via detailed illustration of the preferred embodiments referring to the drawings.

DETAILED DESCRIPTION OF THE PREFERRED EMBODIMENT

Figure 1:
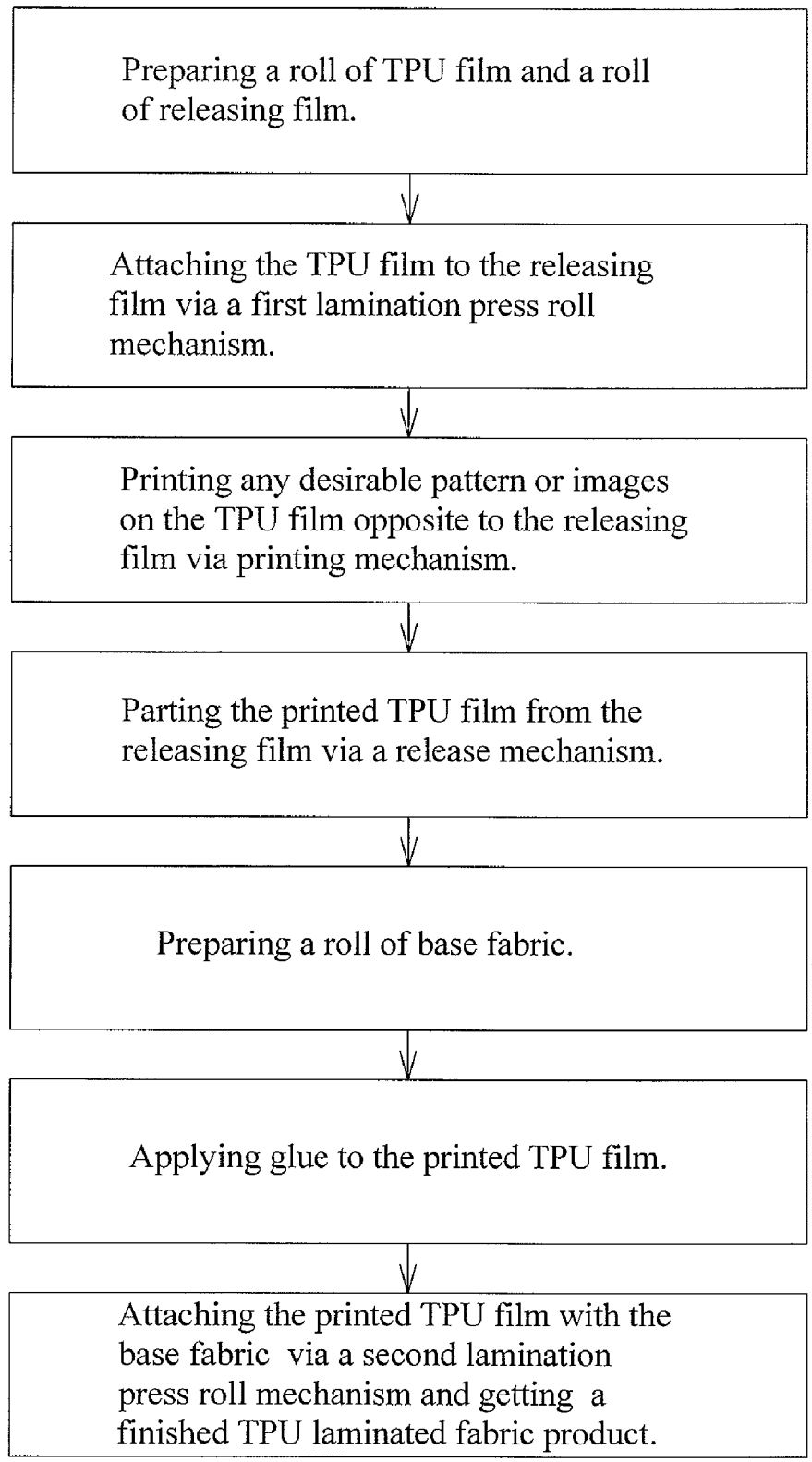
FIG. 1 is a flow chart showing a method for manufacturing TPU laminated fabric products in accordance with the preferred embodiment of the present invention.
Figure 2:
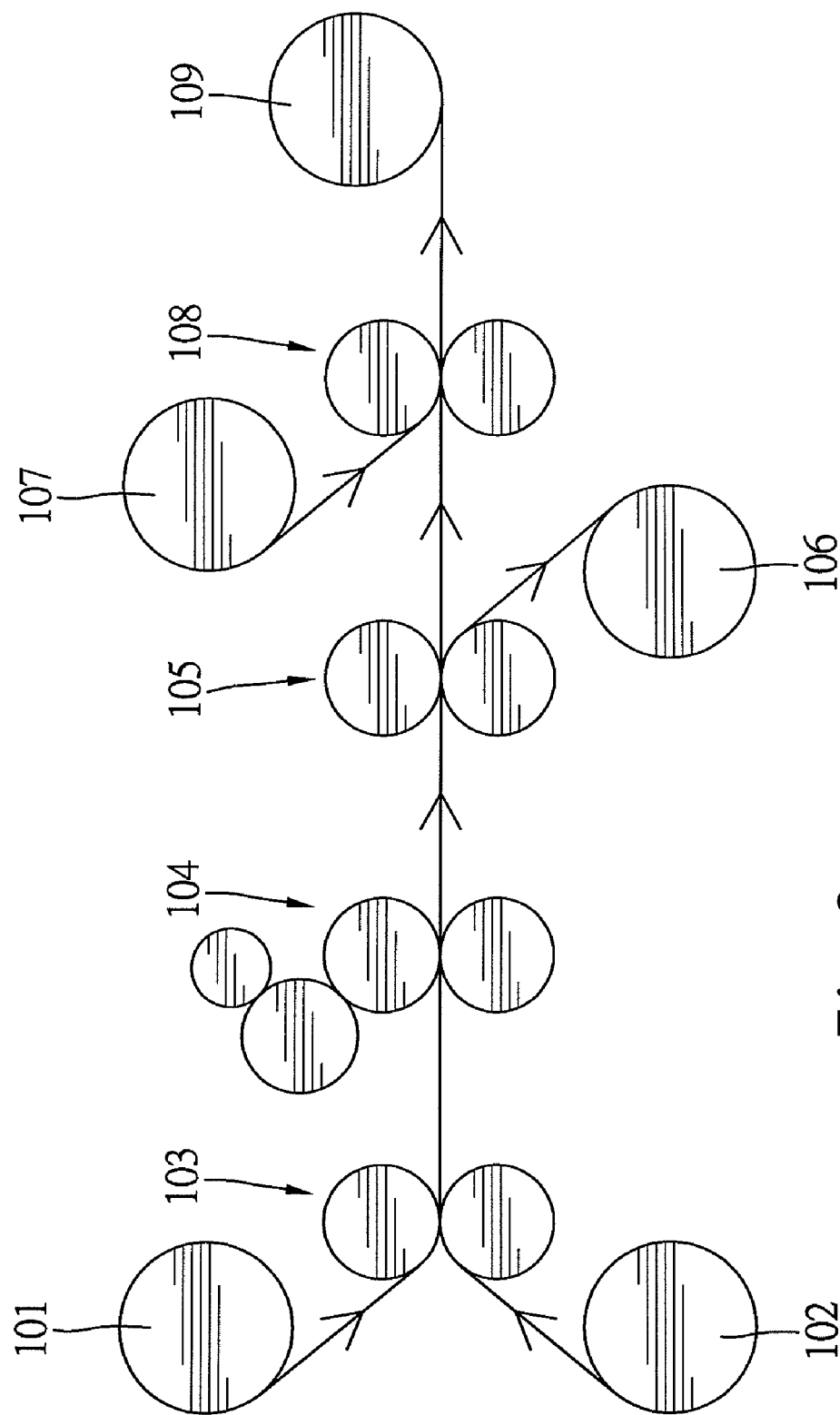
FIG. 2 is a sketch of the manufacturing process of the TPU laminated fabric products in FIG. 1.

Referring to FIGS. 1 through 5, a method for manufacturing TPU laminated fabric products in accordance with the preferred embodiment of the present invention includes the following steps.

First step is preparing a roll of TPU film 10 wound on a TPU film coil cradle 101 and a roll of releasing film 20 wound on a releasing film coil cradle 102. The releasing film 20 is preferably a polyethylene terephthalate film, a polyethylene film, release paper, etc.

Second step is attaching the TPU film 10 to the releasing film 20 via a first lamination press roll mechanism 103.

Third step is printing any desirable pattern or images on the TPU film 10 which is attached with the releasing film 20 via a printing mechanism 104. Inks which are used during the fore-mentioned printing process preferably include water-based ink, environment-friendly ink, etc. The pattern or images can also be applied on the TPU film via a transfer-printing process.

Fourth step is parting the printed TPU film 10 from the releasing film 20 via a release mechanism 105. Then, the parted releasing film 20 is wound on a releasing film wind-up roll 106.

Fifth step is preparing a roll of base fabric 30 wound up to on a base fabric coil cradle 107. The base fabric 30 is preferably microfiber fabric, natural cotton canvas, cotton cambric, synthetic fiber, conductive fabric, etc. The fore-mentioned conductive fabric is made of metallic yarn and fiber. A conductive coating made of the metallic yarn is preferably applied by electroplating to form a conductive surface on the natural fiber. The conductive fabric is adapted for limiting and shielding electronic equipment against all sources of interference due to electromagnetic energies. The metallic yarn is preferably made of aluminum or silver. The fiber for the conductive fabric is preferably made of nylon or cotton cambric.

Sixth step is applying glue 40 to the printed TPU film 10. The glue 40 which is applied onto the printed TPU film 10 is preferably made of resin, etc. and is preferably hot melt glue.

Seventh step is attaching the printed TPU film 10 with glue 40 to the base fabric 30 via a second lamination press roll mechanism 108 and getting a finished TPU laminated fabric product 109. While the printed TPU film 10 with glue 40 is adhered to the base fabric 30 via the second lamination press roll mechanism 108, the predetermined adhering temperatures are controlled from 110 degrees centigrade to 180 degrees centigrade. Then, after the printed TPU film 10 is adhered to the base fabric 30, the predetermined fixing temperatures are controlled from 5 degrees centigrade to 22 degrees centigrade so that the glue 40 solidifies and fixes the printed TPU film 10 to the base fabric 30.

Figure 3:
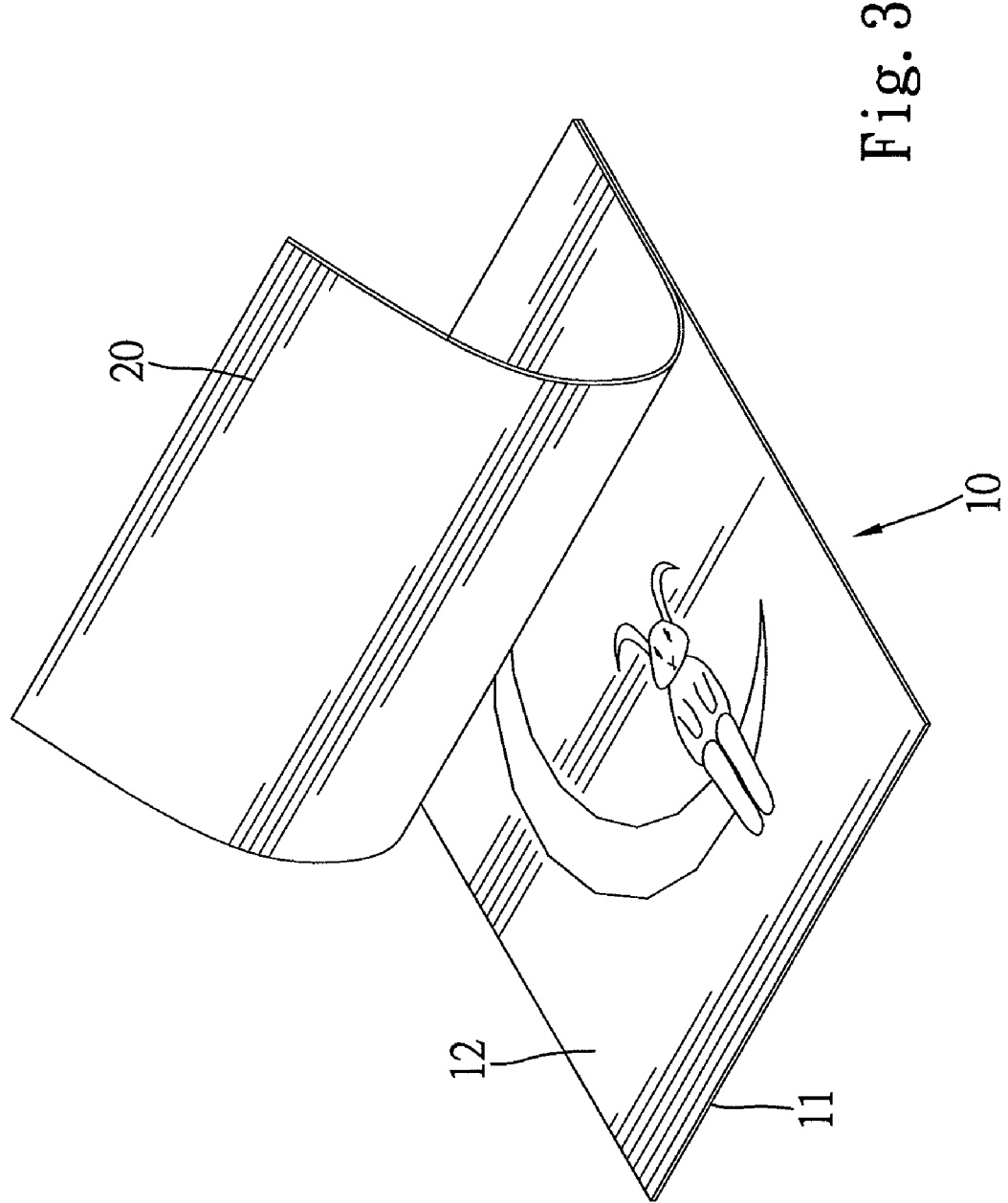
FIG. 3 is a perspective view of the printed TPU film and the releasing film in accordance with the preferred embodiment of the present invention, illustrating the printed TPU film detaching from the releasing film.

Referring to FIG. 3, it shows that the printed TPU film 10 includes a first surface 11 and a second surface 12, with the first surface 11 being printed, and with the second surface 12 attached with the releasing film 20.

Figure 4:
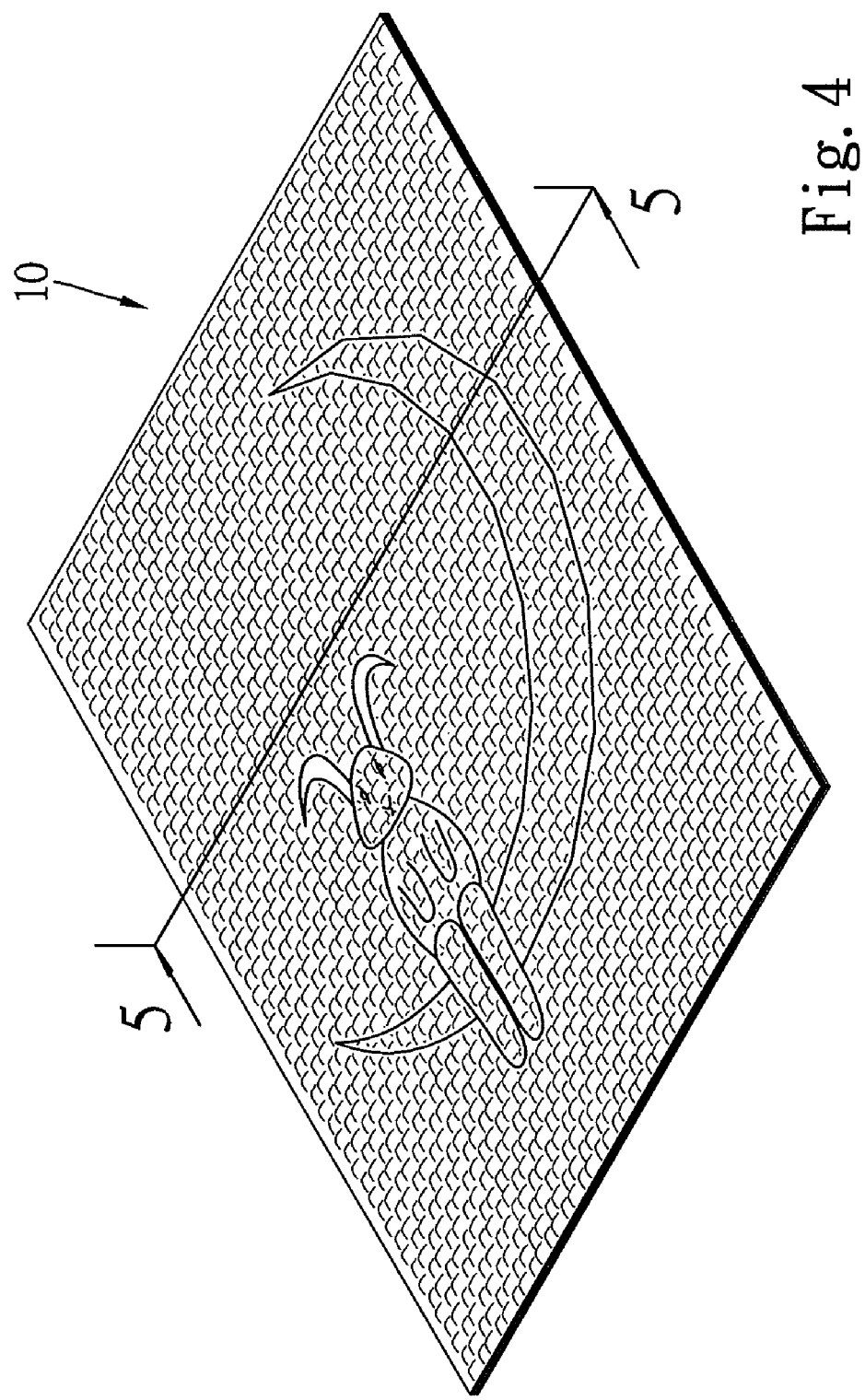
FIG. 4 is a perspective view of the finished TPU laminated fabric product in accordance with the preferred embodiment of the present invention.
Figure 5:
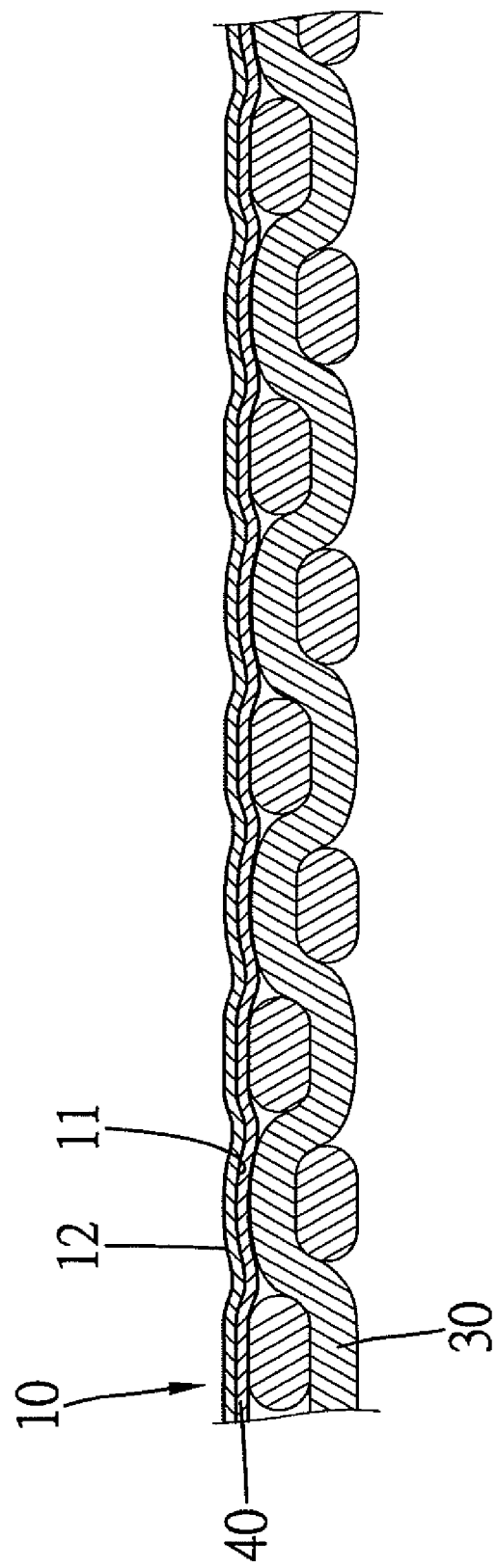
FIG. 5 is a cross-sectional view taken along section line 5-5 in FIG. 4.

After the printed TPU film 10 is detached from the releasing film 20, referring to FIGS. 3 through 5, the glue 40 is applied on the second surface 12 of the TPU film 10 and provided for adhesion of the second surface 12 of the TPU film 10 to the base fabric 30. Therefore, the printed first surface 11 of the TPU film 10 can be protected and prevented from being worn-off. Also, the transparency of TPU allows the printed pattern of images to be seen clearly.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come with the meaning and range of equivalency of the claims are intended to be embraced therein.

What is claimed is:

1. A method for manufacturing a thermoplastic polyurethane (TPU) laminated fabric product comprising:
   preparing a roll of TPU film and a roll of releasing film;
   attaching the TPU film to the releasing film;
   printing a pattern or image on a first surface of the TPU film opposite to the releasing film;
   parting the TPU film from the releasing film after printing the pattern or image;
   preparing a roll of base fabric;
   applying glue to a second surface of the TPU film opposite to the first surface of the TPU film; and
   attaching the second surface of the TPU film to the base fabric and getting a finished TPU laminated fabric product.

2. The method for manufacturing the TPU laminated fabric product as claimed in claim 1, wherein the TPU film is wound on a TPU film coil cradle and the releasing film is wound on a releasing film coil cradle.

3. The method for manufacturing the TPU laminated fabric product as claimed in claim 2, wherein the releasing film is a polyethylene terephthalate film, a polyethylene film or release paper.

4. The method for manufacturing the TPU laminated fabric product as claimed in claim 1, wherein a first lamination press roll mechanism is adapted for attaching the TPU film to the releasing film.

5. The method for manufacturing the TPU laminated fabric product as claimed in claim 1, wherein a printing mechanism is adapted for printing the pattern or image on the TPU film with ink.

6. The method for manufacturing the TPU laminated fabric product as claimed in claim 5, with the ink.

7. The method for manufacturing the TPU laminated fabric product as claimed in claim 5, with the pattern or image applied via a transfer-printing process.

8. The method for manufacturing the TPU laminated fabric product as claimed in claim 1, wherein a release mechanism is adapted for parting the TPU film from the releasing film.

9. The method for manufacturing the TPU laminated fabric product as claimed in claim 1, with the base fabric being microfiber fabric, natural cotton canvas, cotton cambric, synthetic fiber or conductive fabric.

10. The method for manufacturing the TPU laminated fabric product as claimed in claim 1, wherein when the TPU film with the glue is attached to the base fabric, an adhering temperatures is controlled from 110 degrees centigrade to 180 degrees centigrade; wherein the glue solidifies and fixes the TPU film to the base fabric when fixing temperatures are controlled from 5 degrees centigrade to 22 degrees centigrade.

* * * * *